(12) United States Patent
Moromisato et al.

(10) Patent No.: US 7,853,669 B2
(45) Date of Patent: Dec. 14, 2010

(54) MESH-MANAGING DATA ACROSS A DISTRIBUTED SET OF DEVICES

(75) Inventors: George P. Moromisato, Seattle, WA (US); Noah B. Edelstein, Medina, WA (US); Abhay V. Parasnis, Sammamish, WA (US); Anthony D. Andrews, Sammamish, WA (US); Raymond E. Ozzie, Seattle, WA (US); William D. Devlin, Sammamish, WA (US); Akash J. Sagar, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 739 days.

(21) Appl. No.: 11/744,777

(22) Filed: May 4, 2007

(65) Prior Publication Data

US 2008/0276181 A1 Nov. 6, 2008

(51) Int. Cl.
*G06F 15/16* (2006.01)
*G06F 9/44* (2006.01)

(52) U.S. Cl. .................. 709/217; 709/203; 709/204; 719/331

(58) Field of Classification Search .......... 709/204, 709/217, 203; 719/331
See application file for complete search history.

(56) References Cited

U.S. PATENT DOCUMENTS

| | | | |
|---|---|---|---|
| 6,573,907 B1* | 6/2003 | Madrane | 715/719 |
| 6,907,451 B1* | 6/2005 | Mukundan et al. | 709/204 |
| 6,952,714 B2* | 10/2005 | Peart | 709/203 |
| 7,054,927 B2 | 5/2006 | Ulrich et al. | |
| 7,117,243 B2* | 10/2006 | Peart | 709/203 |
| 7,146,524 B2 | 12/2006 | Patel et al. | |
| 7,149,959 B1* | 12/2006 | Jones et al. | 715/234 |
| 7,330,872 B2* | 2/2008 | Peart et al. | 709/203 |
| 7,406,542 B2* | 7/2008 | Erlingsson | 709/246 |
| 2002/0103811 A1 | 8/2002 | Fankhauser et al. | |
| 2003/0033308 A1 | 2/2003 | Patel et al. | |
| 2003/0074393 A1* | 4/2003 | Peart | 709/203 |
| 2004/0133589 A1 | 7/2004 | Kiessig et al. | |
| 2004/0236801 A1 | 11/2004 | Borden et al. | |
| 2005/0060315 A1 | 3/2005 | Sanin | |
| 2005/0060581 A1* | 3/2005 | Chebolu et al. | 713/201 |
| 2006/0036602 A1 | 2/2006 | Unangst et al. | |
| 2006/0080353 A1 | 4/2006 | Miloushev et al. | |
| 2006/0123010 A1 | 6/2006 | Landry et al. | |

OTHER PUBLICATIONS

Peisheng Zhao et al. "Grid Metadata Catalog Service-Based OGC Web Registry Service", Proceedings of the 12th annual ACM international workshop on Geographic information systems, 2004.
Efstratios Valavanis et al. "MobiShare: Sharing Context-Dependent Data & Services from Mobile Sources", Proceedings. IEEE/WIC International Conference on Web Intelligence, 2003. WI 2003.
Wolfgang Hoschek et al. "Grid Enabled Relational Database Middleware", Informational document, Global Grid Forum, Oct. 2001.
International Search Report for PCT/US2008/062191 mailed Oct. 21, 2008. 10 Pages.

* cited by examiner

*Primary Examiner*—Saleh Najjar
*Assistant Examiner*—Vitali Korobov
(74) *Attorney, Agent, or Firm*—L. Alan Collins; Collins & Collins Incorporated

(57) ABSTRACT

Data files, applications and/or corresponding user interfaces may be accessed at a device that collaborates in a mesh. The mesh may include any number or type of devices that collaborate in a network. Data, applications and/or corresponding user interfaces may be stored within a core object that may be shared over the mesh. Information in the core object may be identified with a corresponding user such that a user may use any collaborating device in the mesh to access the information. In one example, the information is stored remotely from a device used to access the information. A remote source may store the desired information or may determine the storage location of the desired information in the mesh and may further provide the desired information to a corresponding user.

18 Claims, 10 Drawing Sheets

MESH-MANAGING DATA ACROSS A DISTRIBUTED SET OF DEVICES

BACKGROUND

Computers are often used to access data. Typically, a computer includes a memory in which data is stored. The stored data may include files containing relevant information, application programs to run the files, settings, etc. Problems arise when a user wishes to access any or all of the information on one computer while working on a second computer. When the user moves to the second computer, data available on the first computer is often unavailable on the second computer.

A user may copy a data file to a portable storage device (or a web site) and physically transport the portable storage device and the copy of the data file from the first computer to the second computer. However, additional information or data may be missing on the second computer such that the user would still be unable to fully access the data file on the second computer. For example, the application program needed to run the data file may be installed only on the first computer. In this case, the user would be unable to open or otherwise access the data file on the second computer, which lacks the needed application program. Moreover, various additional issues, such as licensing issues or privacy issues, would preclude merely copying certain other types of data to the second computer.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one example, a core object as described herein including relevant data or information is stored at a location that is remote from a collaborating device such as a computing device. The core object may include data files, applications corresponding to the data files, and user interfaces corresponding to the data files or applications. The core object information may be controlled or owned by a user rather than by a device associated with the user. Hence, in one example, a user may access or launch data files or applications on any device even if the device does not store, control or own the desired information.

In one example, a mesh is provided that contains any number or type of collaborating devices. The mesh may further include a remote storage location in which metadata, applications, or any relevant data or information may be stored and accessed by any of the collaborating devices in the mesh. Data and applications may be projected in a core object to any of the collaborating devices based on user identify. For example, the core object may be owned by a user such that the data is identified with the user. If the core object is stored remotely from the user's device, the location of the data may be determined in the mesh and the desired data may be projected to the user's device.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples. Systems described herein are provided as examples and not limitations. As those skilled in the art will appreciate, the present examples are suitable for application in a variety of different types of computing systems.

Figure 1:
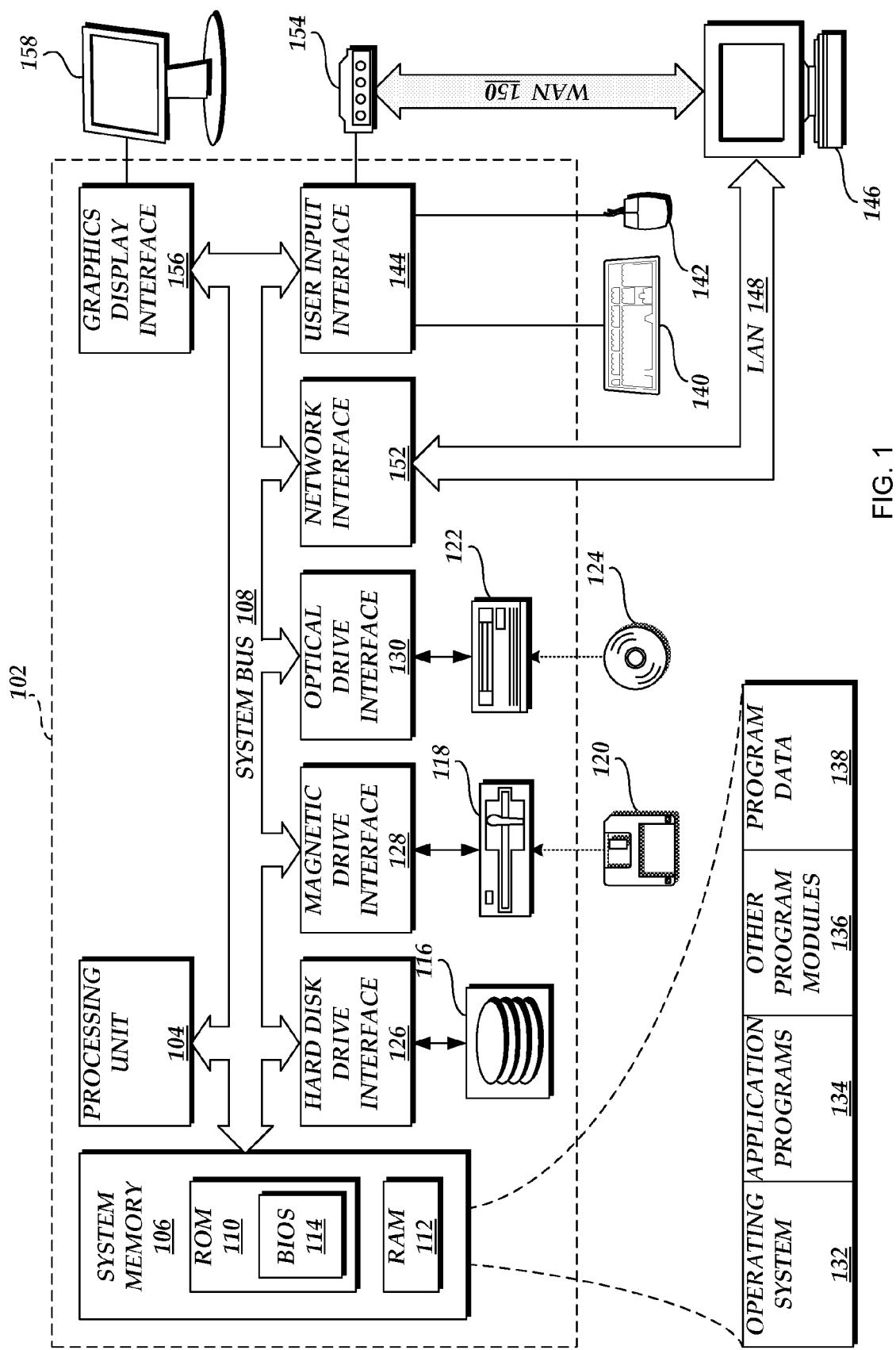
FIG. 1 illustrates an example of a suitable computing system environment in which data or other relevant information may be provided.

FIG. 1 illustrates an example of a suitable computing system environment or architecture in which computing subsystems may provide processing functionality. The computing system environment is only one example of a suitable computing environment and is not intended to suggest any limitation as to the scope of use or functionality of the invention. Neither should the computing environment be interpreted as having any dependency or requirement relating to any one or combination of components illustrated in the exemplary operating environment.

The method or system disclosed herein is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The method or system may be described in the general context of computer-executable instructions, such as program modules, being executed by a computer. Generally, program modules include routines, programs, objects, components, data structures, etc. that perform particular tasks or implement particular abstract data types. The method or system may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the method or system includes a general purpose computing device in the form of a computer 102. Components of computer 102 may include, but are not limited to, a processing unit 104, a system memory 106, and a system bus 108 that couples various system components including the system memory to the processing unit 104. The system bus 108 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 102 typically includes a variety of computer readable media. Computer readable media can be any available media that can be accessed by computer 102 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 102. Combinations of the any of the above should also be included within the scope of computer readable storage media.

The system memory 106 includes computer storage media in the form of volatile and/or nonvolatile memory such as read only memory (ROM) 110 and random access memory (RAM) 112. A basic input/output system 114 (BIOS), containing the basic routines that help to transfer information between elements within computer 102, such as during start-up, is typically stored in ROM 110. RAM 11 2 typically contains data and/or program modules that are immediately accessible to and/or presently being operated on by processing unit 104. By way of example, and not limitation, FIG. 1 illustrates operating system 132, application programs 134, other program modules 136, and program data 138.

The computer 102 may also include other removable/non-removable, volatile/nonvolatile computer storage media. By way of example only, FIG. 1 illustrates a hard disk drive 116 that reads from or writes to non-removable, nonvolatile magnetic media, a magnetic disk drive 118 that reads from or writes to a removable, nonvolatile magnetic disk 120, and an optical disk drive 122 that reads from or writes to a removable, nonvolatile optical disk 124 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 116 is typically connected to the system bus 108 through a non-removable memory interface such as interface 126, and magnetic disk drive 118 and optical disk drive 122 are typically connected to the system bus 108 by a removable memory interface, such as interface 128 or 130.

The drives and their associated computer storage media discussed above and illustrated in FIG. 1, provide storage of computer readable instructions, data structures, program modules and other data for the computer 102. In FIG. 1, for example, hard disk drive 116 is illustrated as storing operating system 132, application programs 134, other program modules 136, and program data 138. Note that these components can either be the same as or different from additional operating systems, application programs, other program modules, and program data, for example, different copies of any of the elements. A user may enter commands and information into the computer 102 through input devices such as a keyboard 140 and pointing device 142, commonly referred to as a mouse, trackball or touch pad. Other input devices (not shown) may include a microphone, joystick, game pad, pen, scanner, or the like. These and other input devices are often connected to the processing unit 104 through a user input interface 144 that is coupled to the system bus, but may be connected by other interface and bus structures, such as a parallel port, game port or a universal serial bus (USB). A monitor 158 or other type of display device is also connected to the system bus 108 via an interface, such as a video interface or graphics display interface 156. In addition to the monitor 158, computers may also include other peripheral output devices such as speakers (not shown) and printer (not shown), which may be connected through an output peripheral interface (not shown).

The computer 102 may operate in a networked environment using logical connections to one or more remote computers, such as a remote computer. The remote computer may be a personal computer, a server, a router, a network PC, a peer device or other common network node, and typically includes many or all of the elements described above relative to the computer 102. The logical connections depicted in FIG. 1 include a local area network (LAN) 148 and a wide area network (WAN) 150, but may also include other networks. Such networking environments are commonplace in offices, enterprise-wide computer networks, intranets and the Internet.

When used in a LAN networking environment, the computer 102 is connected to the LAN 148 through a network interface or adapter 152. When used in a WAN networking environment, the computer 102 typically includes a modem 154 or other means for establishing communications over the WAN 150, such as the Internet. The modem 154, which may be internal or external, may be connected to the system bus 108 via the user input interface 144, or other appropriate mechanism. In a networked environment, program modules depicted relative to the computer 102, or portions thereof, may be stored in the remote memory storage device. By way of example, and not limitation, remote application programs may reside on a memory device. It will be appreciated that the network connections shown are exemplary and other means of establishing a communications link between the computers may be used.

A system and method is described for providing a mesh in which data files, applications, user interfaces, and other relevant information of a user may be accessed or provided at any number or type of devices. A mesh may include a storage location and/or a substrate or core object that brings together any number or any type of devices in a network. The substrate or core object of the mesh may include relevant information such as data files, applications corresponding to the data files, and/or user interfaces. The core object may further include any other type of information or data including, for example, metadata, state information, etc. Information and/or data may be communicated via the mesh through the core object to any device in the mesh. Also, the devices in the mesh may be heterogeneous, of any type, cooperative or collaborative with each other or with a mesh storage device or location, and/or distributed.

Any desired information may be included in a core object which may be projected from a storage location in the mesh to one or more devices cooperating in the mesh. A user may view any or all of the devices in the mesh via a view displayed at one or more device collaborating in the mesh. The view may include information on any of the data, applications, user interfaces, or other data or information associated with the user. Also, the core object or any information or data from the core object may be unassociated with any of the devices in the mesh. When a core object is unassociated with a device, the core object may not be stored locally on the device with which the core object is unassociated, for example. In this case, the core object may be projected to any device without being stored on the device receiving the projection of the core object. Hence, the core object may be stored remotely from the device such that the core object is stored at a location that is away from the device itself. In this way, any data file, application, user interface, etc. may be accessed and/or executed at a device in the mesh even when the data or information is not stored locally at the device. In another example, a portion of the core object may be stored locally while a portion of the core object may be stored remotely.

There are many examples of projecting a core object to a device in a mesh. In one example, the core object is stored remotely from at least one device associated with a user (i.e., not stored on the at least one device itself). Projection of the core object to the at least one device may include accessing a desired data file at the at least one device where the desired data file may be stored at a location other than locally at the at least one device itself. The data file may be activated or launched through execution of an application corresponding to the data file.

In one example, a device may receive an input from a user to access a desired data file. For example, a user interface may be displayed on a display of the device that provides a user with a list of data file selections. The user may select a desired data file from the list of data file selections on the display or user interface. An application program corresponding to the selected desired data file may not be located or stored locally at the device. If the application corresponding to the data file is not stored locally on the device, the location of the application or the storage location of the application may be determined. Based on the determined location of the application to launch the desired data file, the application may be launched or executed at the device even though the application is not stored at the device itself.

Also, the devices in the mesh may be in any configuration or network topology. The configuration of the devices in the mesh may be modified such that any of the devices may be moved from any location within the mesh to any other location within the mesh or may be removed from the mesh. Similarly, any device may be added to the mesh in any desired configuration or location. Hence, the devices in the mesh may be location-independent within the mesh.

Any of the devices in the mesh may include a mesh operating environment (MOE). The MOE may include executable code for providing a view of devices, data files, applications, or any desired information of interest in the mesh and also for providing services for facilitating connection of the device or other entity to the mesh. These services may include services for enabling participation of the device or other entity in the mesh, synchronizing the device/entity, user management, etc. Hence, the MOE may include any type of view or service associated with a device in the mesh or any data files or applications associated with the mesh. For example, a user may wish to access a data file on a collaborating device in a mesh. In one example, the data file and/or the application program corresponding to the data file may not be stored locally at the collaborating device. The data file may be presented to the user at the collaborating device via a view. The view may contain an interface with a unified depiction of the mesh which may include information on devices, data, applications, user interfaces, etc. in the mesh. In this example, presence of the data file may be provided in the view. If the data file is not stored locally at the collaborating device itself, an indication of the remote storage location of the data file may be provided in the view, if desired. For example, the data file may be displayed as an icon in which the icon contains an indication that the data file is not stored locally. In one example, the icon may be displayed in a ghosted form (e.g., "grayed out") to indicate that the data file is not stored locally. Alternatively, any indication may be used to indicate the data file is not stored locally.

In another example, the data file may be stored locally in which case the device may access a local memory store to obtain the desired data file. Also, the data file may be associated with a corresponding application, the execution of which may result in display of the data file. Also, execution of the corresponding application may provide certain predetermined functionality of the data file. If the data file and corresponding application are stored locally at the collaborating device and a selection is received by the system of the data file, the selected data file may be launched or executed by accessing a local memory store of the collaborating device and executing the corresponding application to open or activate the selected data file.

In another example, the data file and/or the corresponding application may not be stored locally at the collaborating device. For example, a user may be using the collaborating device in the mesh to access a desired data file. An application program corresponding to the desired data file may be used to open or activate the desired data file such that the desired data file may be viewed, modified, manipulated, or otherwise operated on. If the application corresponding to the desired data file is not stored locally at the collaborating device on which the user requests access to the desired data file, the collaborating device may contact a remote source to determine the location of the desired data file and/or the corresponding application of the desired data file.

The remote source for determining the location of the desired data, information, applications, etc. may be located at any desired location. For example, the remote source may be located at a location that is remote from the collaborating device or may be located remotely from any collaborating device in the mesh. In one example, the remote source includes a metadata store or cloud services, or designated storage device, for example, in which any desired data, applications, user interfaces, etc. may be stored or may be accessed by any collaborating device in the mesh.

In this example, the collaborating device in the mesh may contain an MOE that may contact a remote source for determining a location of a desired data file, application and/or user interface. The MOE may execute on the collaborating device to determine via the remote source a location of the desired information. The location of the desired information may be returned to the collaborating device from the remote source. Responsive to the received location information, the MOE of the collaborating device may execute to identify the device or storage location to retrieve the desired information or data. In one example, the desired information may be transmitted from the identified storage location and stored on the collaborating device.

A user may be associated with any number of devices or any type of devices in a mesh. For example, a user may use a corporate desktop computer, a home computer, a publicly shared computer, a laptop computer, a tablet PC, or a handheld computer or communication device, to name a few. Additionally, a user may wish to access data files or any other desired information or data from any of the devices.

Figure 2:
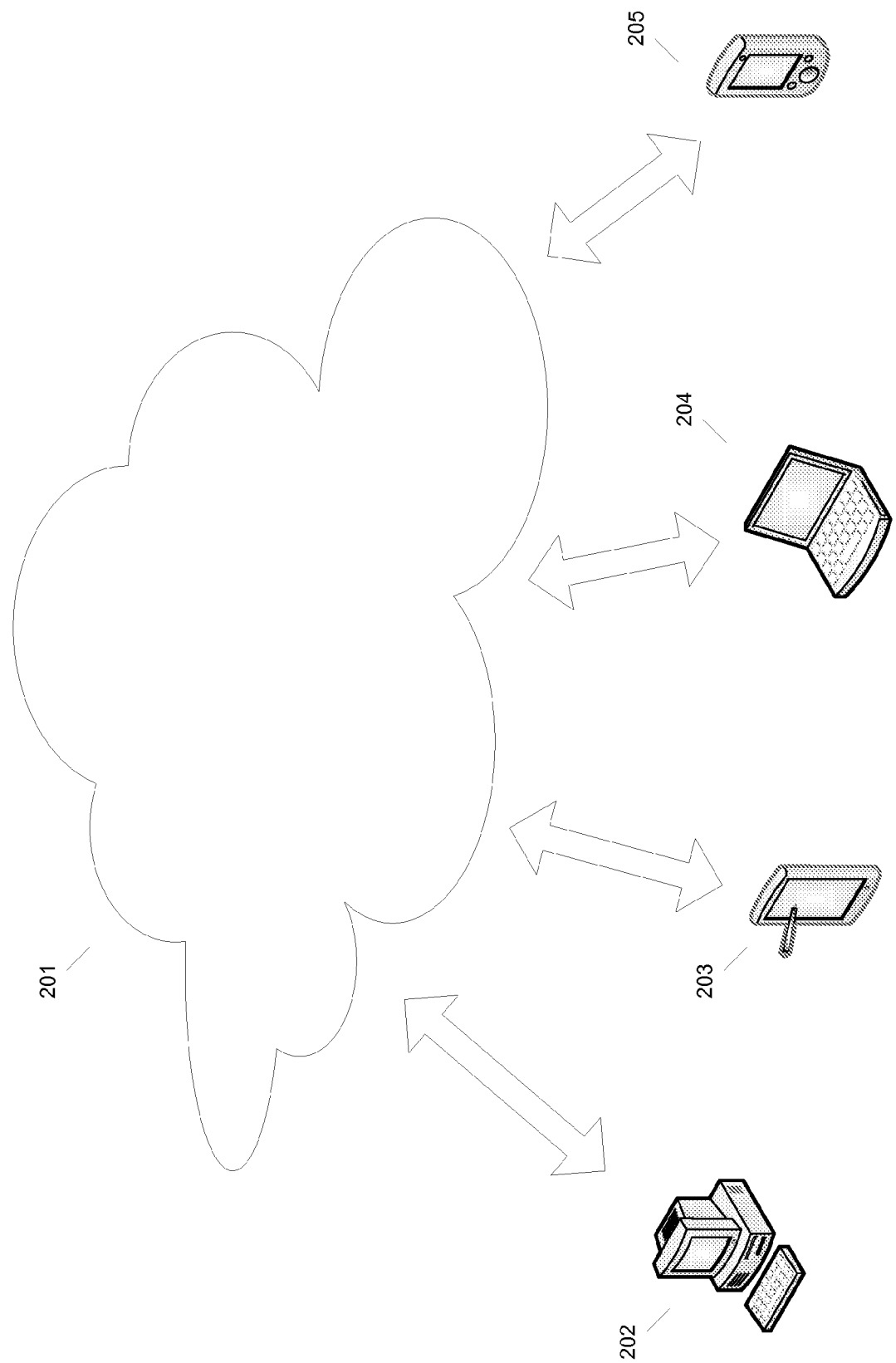
FIG. 2 illustrates an example of data access and storage.

Information relevant to the user may be stored remotely from the devices associated with the user. In addition, the relevant information may be associated with a user rather than a device corresponding to the user. For example, the data or information may be stored in a device, a cloud, or at any location. FIG. 2 illustrates one example in which data may be stored in a cloud 201. The information may further be projected to any number or type of devices that are associated with the user. In this example, the devices include a desktop computer 202, a tablet PC 203, a laptop computer 204 and a handheld computing device 205. Hence, any of the devices may receive information or data from a remote source in the cloud 201.

Figure 3:
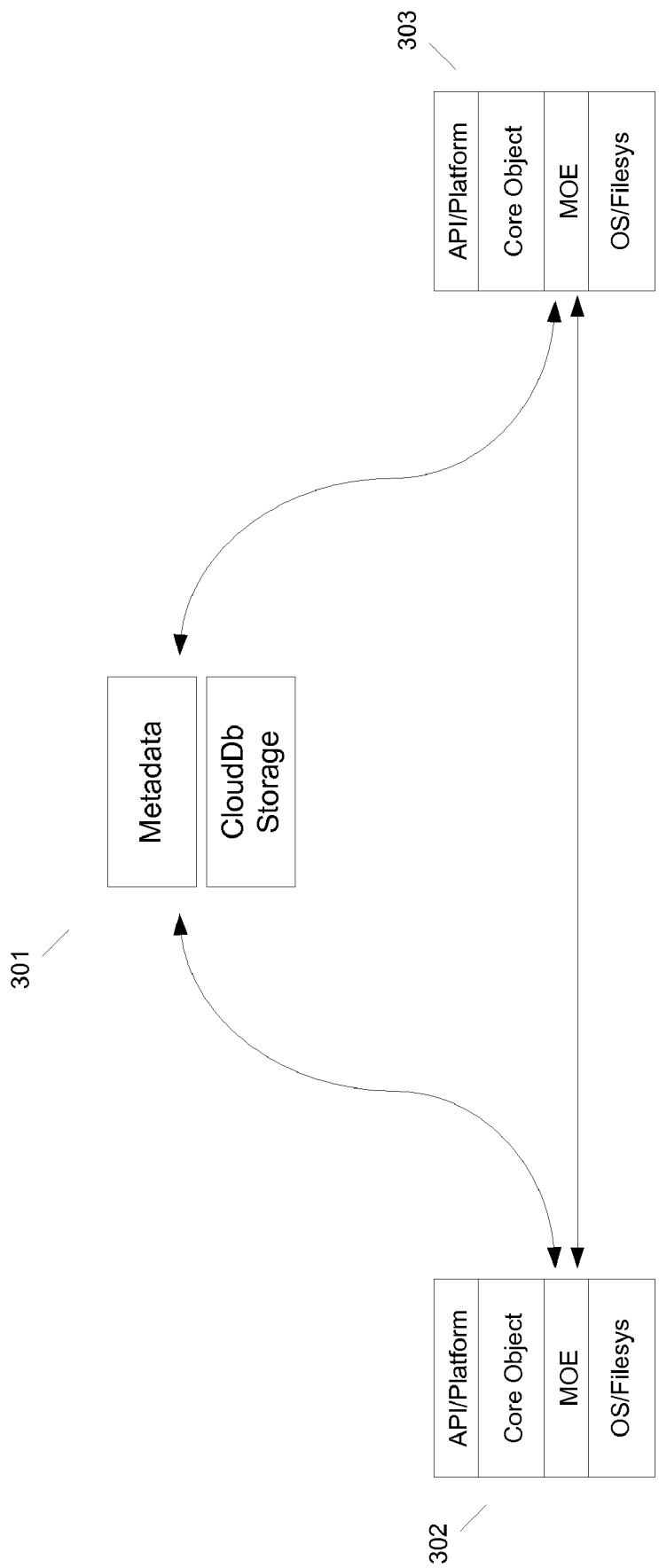
FIG. 3 illustrates another example of data access and storage.

FIG. 3 illustrates another example of data access and/or storage. In this example, a first computing device 302 and a second computing device 303 are in communication with a cloud database storage 301 in a mesh. FIG. 3 illustrates two computing devices, however, any number of computing devices may be included in the mesh. The cloud database storage 301 may further include a metadata store for describing or characterizing data pertaining to the user or for identifying identified data, applications, or other desired information. As FIG. 3 illustrates, any of the computing devices (e.g., the first computing device 302 and/or the second computing device 303) may contain an operating system and a mesh operating environment (MOE) in which the MOE may execute to provide a view and services of the mesh to the user on any of the computing devices.

In addition, any of the computing devices (e.g., first computing device 302 and/or second computing device 303) may include at least one core object. The core object may describe an experience with respect to data and information and may be moved over the mesh or accessed via the mesh. For example, the core object may include any desired data such as a data file, an application corresponding to the data file, and/or a user interface associated with the application and/or data file. As set forth above, the core object may also include any additional data or information such as, but not limited to, metadata or state information. A core object containing a data file, corresponding application for executing or activating the data file, and/or a user interface associated with the application or data file may be accessed by a computing device such as first computing device 302 where the core object being accessed is stored at a location that is remote from the location of the first computing device 302. For example, the core object being accessed may be stored at the second computing device 303 in this example. Alternatively or additionally, the core object may be stored at the cloud database storage 301.

The first computing device 302 may receive an input command, for example, from a user. The input command may include a selection of a desired data file. In one example, the first computing device 302 does not store the desired data file such that the desired data is not located locally at the first computing device 302. For example, the first computing device 302 may include a memory for storing data. However, the desired data file is not stored in the memory of the first computing device 302. In addition, the desired data file may have an associated application for executing, opening, or activating the desired data file. In another example, the memory of the first computing device 302 does not store the application. Hence, the memory of the first computing device 302 may lack the desired data file, the application associated with the desired data file, or both.

The first computing device 302 may further include a MOE for communicating with a remote source. Responsive to receiving the input command, the MOE of the first computing device 302 may execute to contact a remote storage location to determine a location of the desired data file and/or application associated with the desired data file. The remote storage location may include any type of data storage. For example, the remote storage location may be located remotely from the first computing device 302 and may store identifier information for identifying devices in the mesh and/or storage locations of data, applications, metadata, or any other relevant data or information in the mesh. Additionally or alternatively, the remote storage location may also store relevant data or information locally at the remote storage location. In another example, a peer-to-peer arrangement or a collaborative arrangement may be used. For example, the MOE of the first computing device 302 may execute to contact at least one other peer device in the network. The at least one peer device may provide identifier information or other mesh information. Any number of devices in the mesh may be used for providing the information.

The MOE in the first computing device 302 may contact the metadata store of the cloud database storage 301 to determine a storage location of the desired information. In one example, the metadata store of the cloud database storage 301 may locate the desired data file and/or application at the second computing device 303 and send an instruction to the first computing device 302 indicating the location of the second computing device 303 as containing the desired information. Responsive to the instruction from the cloud database storage 301, the first computing device 302 may execute the corresponding MOE or execute a service containing the MOE to contact the second computing device 303 to receive the desired data, information, application, etc. The requested information may then be communicated or projected from the second computing device 303 to the first computing device 301. Hence, in this example, the selected data file may be opened or activated on the first computing device 302 even if the data file, application corresponding to the data file, and/or the user interface associated with the application or data file is/are not stored locally at the first computing device 302.

Also in this example, the data file, application, user interface, or other information from the second computing device 303 may be modified, logged, or otherwise manipulated on at the first computing device 302 via any action or event taken at the first computing device 302. The events or actions taken at the first computing device 302 pertaining to the data, information, application, etc. projected from the second computing device 303 may be monitored or updated at the second computing device 303. Hence, data, applications, etc. at a first computing device 302 that are altered or updated may be synchronized with the corresponding data or information at the second computing device 302.

Figure 4:
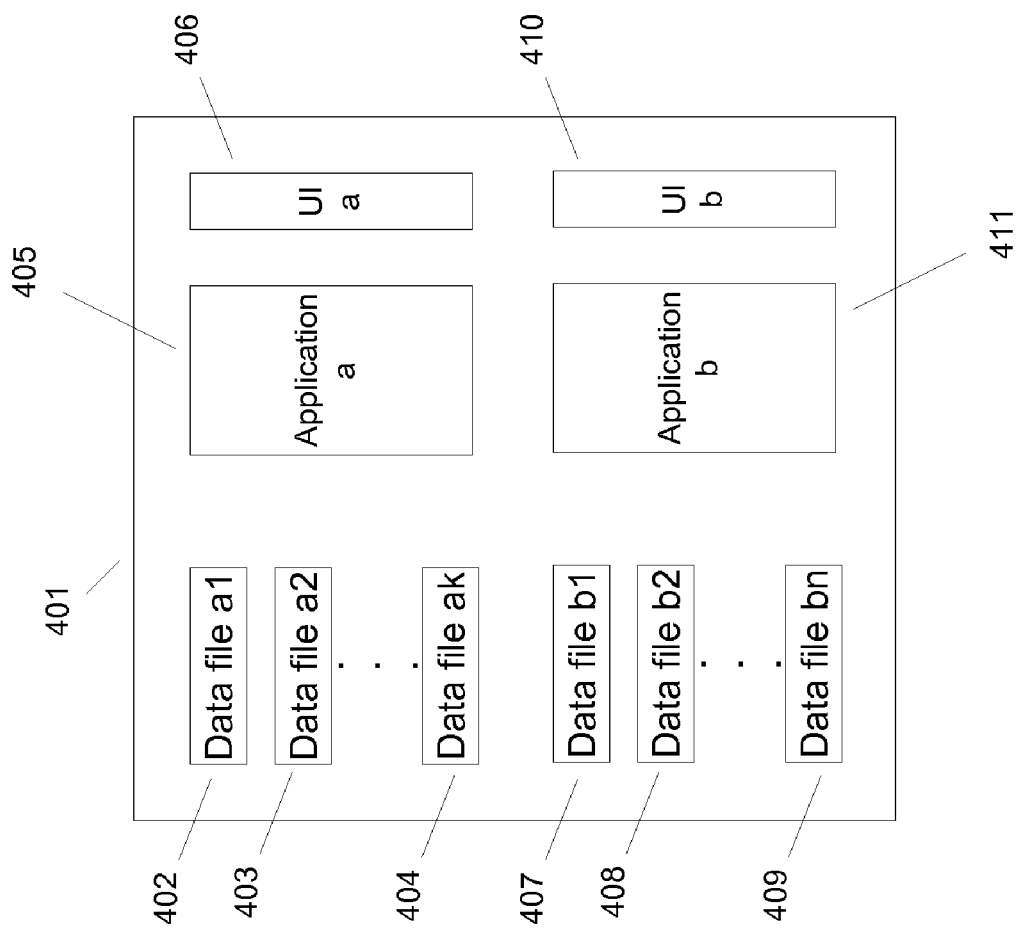
FIG. 4 illustrates one example of a core object.

FIG. 4 illustrates one example of a core object. FIG. 4 is merely one example as the core object may contain any additional elements as desired. For example, the core object may further include state information or metadata. In this example, a core object 401 may include any number of data files, any number of applications and any number of user interfaces (UI). As FIG. 4 illustrates, the core object 401 may include k data files (data files a1 402, data file a2 403, data file ak 404) corresponding to application a 405. For example, any of data files 402-404 may be opened, activated, launched, or displayed by executing the corresponding application a 405. Also, data in the data file may be provided in a user interface 406 corresponding to the application a 405 and the corresponding data file. Any number of data files, applications and user interfaces may be included in the core object. As FIG. 4 illustrates, the core object 401 further includes a second set of data files (data file b1 407, data file b2 408, data file bn 409), corresponding application b 411, and corresponding user interface b 410. Hence, any of data files 407-409 may be opened, activated, launched or otherwise activated by corresponding application 411.

The core object, such as the core object 401 illustrated in FIG. 4, may be accessed over a mesh between any number of collaborating devices in the mesh. For example, one device in the mesh may access the core object at a remote location. Information in the core object may be projected from the remote location or remote device to the mesh device. In addition, a view may be projected to the mesh device for displaying mesh information. For example, the view may be displayed on a display of a mesh device containing a view of the mesh, devices of the mesh, and files or applications stored at remote locations from the mesh device.

Figure 5:
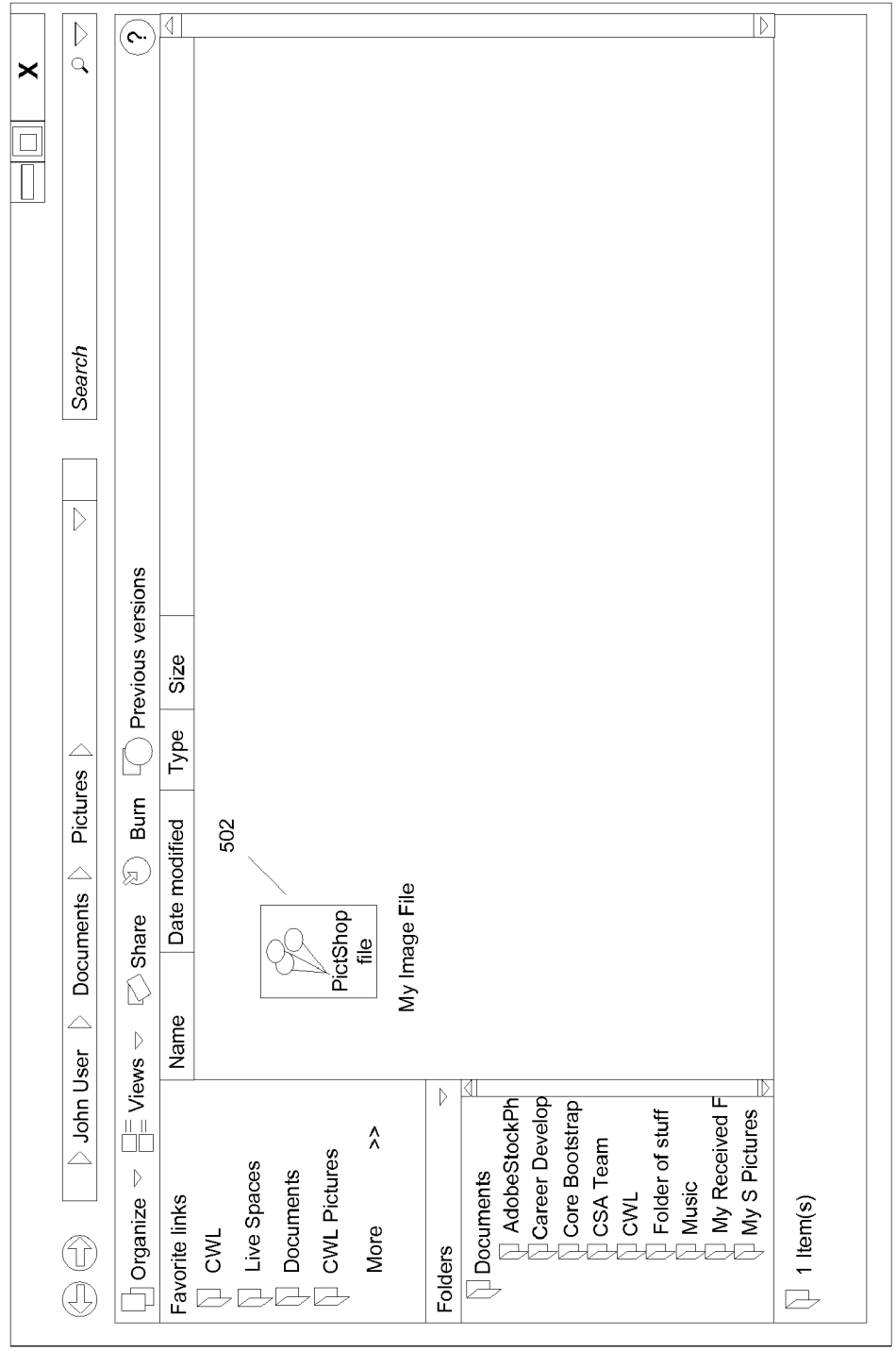
FIG. 5 illustrates an example of a user interface displayed on a collaborating device in a mesh.

FIG. 5 illustrates an example of a user interface displayed on a collaborating device in a mesh. In this example, the collaborating device may display a user interface 501 containing a graphic representing a data file. In this case, the graphic is an icon or thumbnail 502 corresponding to an image file of a certain application (in this example, an image file that is a "PictShop" application file entitled "My Image File"). The image file represented by icon 502 may be associated with a particular user. Also, the image file may not be associated with a computing device that displays the image file icon 502. Because the image file in this example is associated with the user rather than a particular computing device, the user may use any computing device to access the image file. For example, a user may use a first computing device to access the image file by launching a corresponding application. The user may subsequently move to a second computing device in which the second computing device does not contain the application corresponding to the image file. In this example, even though the second computing device does not contain the application corresponding to the image file, the user may still use the second computing device to access or open the image file because the data is associated with the user rather than with the computing devices themselves. Thus, a user to whom the image file is associated may use any collaborating device in the mesh to access the image file even if the image file is not stored on the collaborating device being used.

Figure 6:
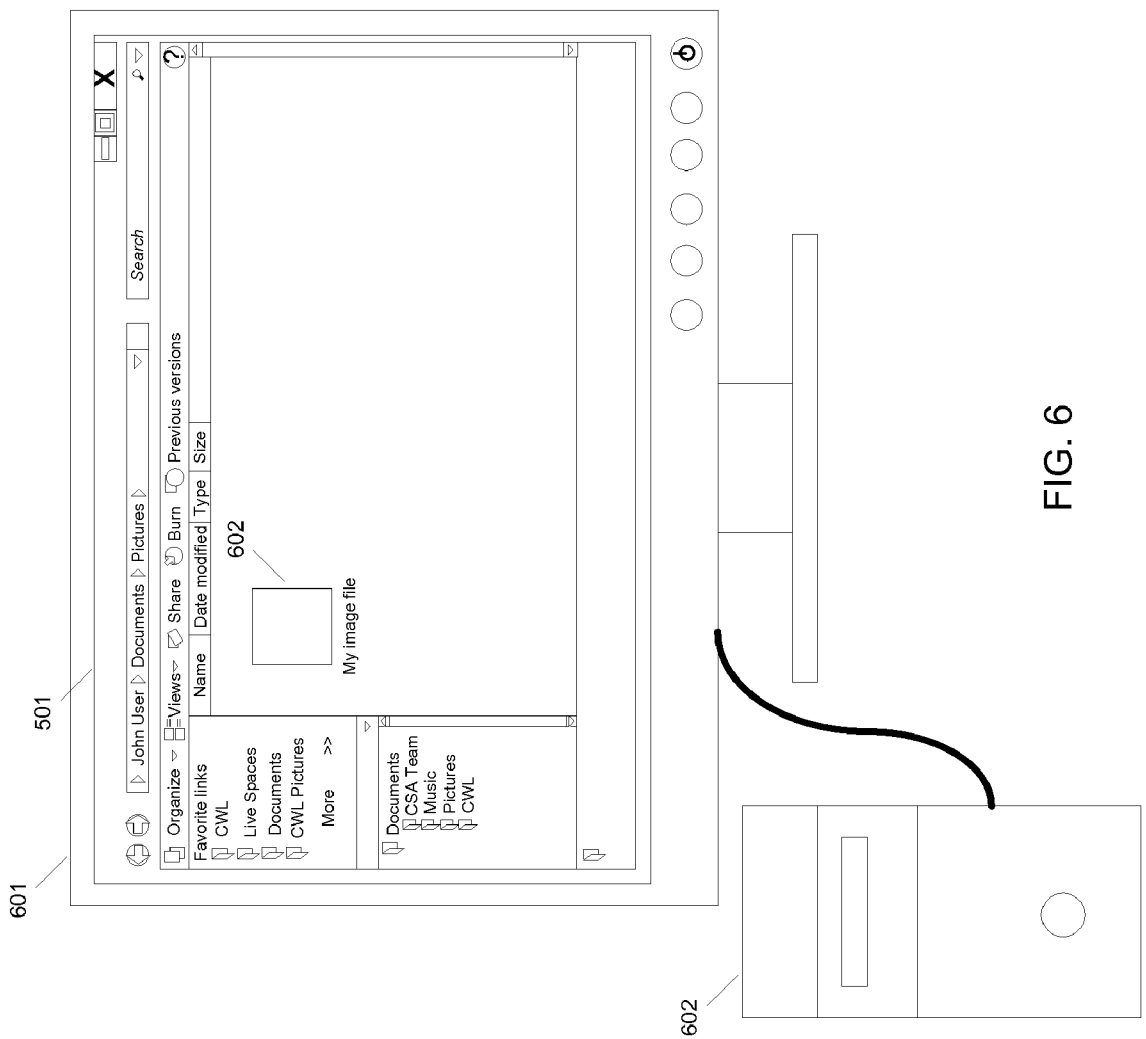
FIG. 6 illustrates an example of a computing device.

In one example, the image file represented by icon 502 is not stored locally on the device being used to access the image file. FIG. 6 illustrates an example of a computing device 602 in connection with a display device 601. The display device 601 displays a window or user interface 501 containing information of available data files. In this case, an icon 502 corresponding to "My Image File" is displayed in the user interface 501 on the display device 601. Also in this example, the data or image file corresponding to the icon 502 is not stored locally on the computing device (e.g., not stored in memory of computing device 602). Rather, the image file may be stored remotely from the computing device and may be projected to the computing device to be provided to the user.

Figure 7:
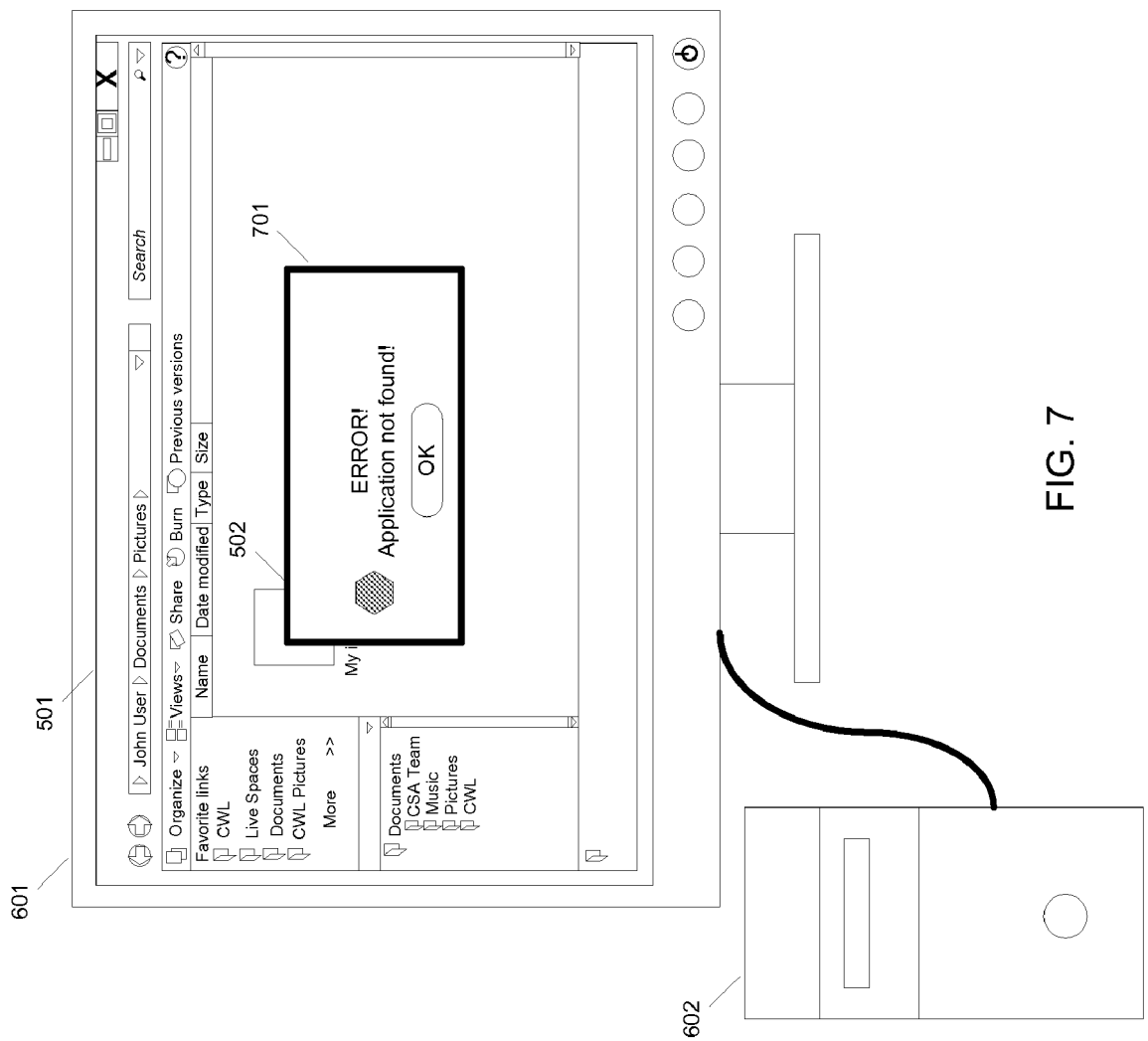
FIG. 7 illustrates an example of a typical message when an application application program corresponding to the data file is not stored locally at the device.

FIG. 7 illustrates an example of a typical message provided when access from a device to a data file at the device is attempted when an application program corresponding to the data file is not stored locally at the device. In this case, a computing device 602 containing a memory (not shown) is connected to a display device 601 the displays a user interface 501 containing an icon 502 corresponding to a data file. However, an application program corresponding to the data file is not stored locally in memory of the computing device 602. A selection of the icon 502 is received via the user interface or window 501 displayed on the display device 601. Because the corresponding application program is not stored locally in memory of the computing device 602, an error message 701 is displayed indicating that the application is not found. Hence, access to the data file is not accomplished in this example.

Figure 8:
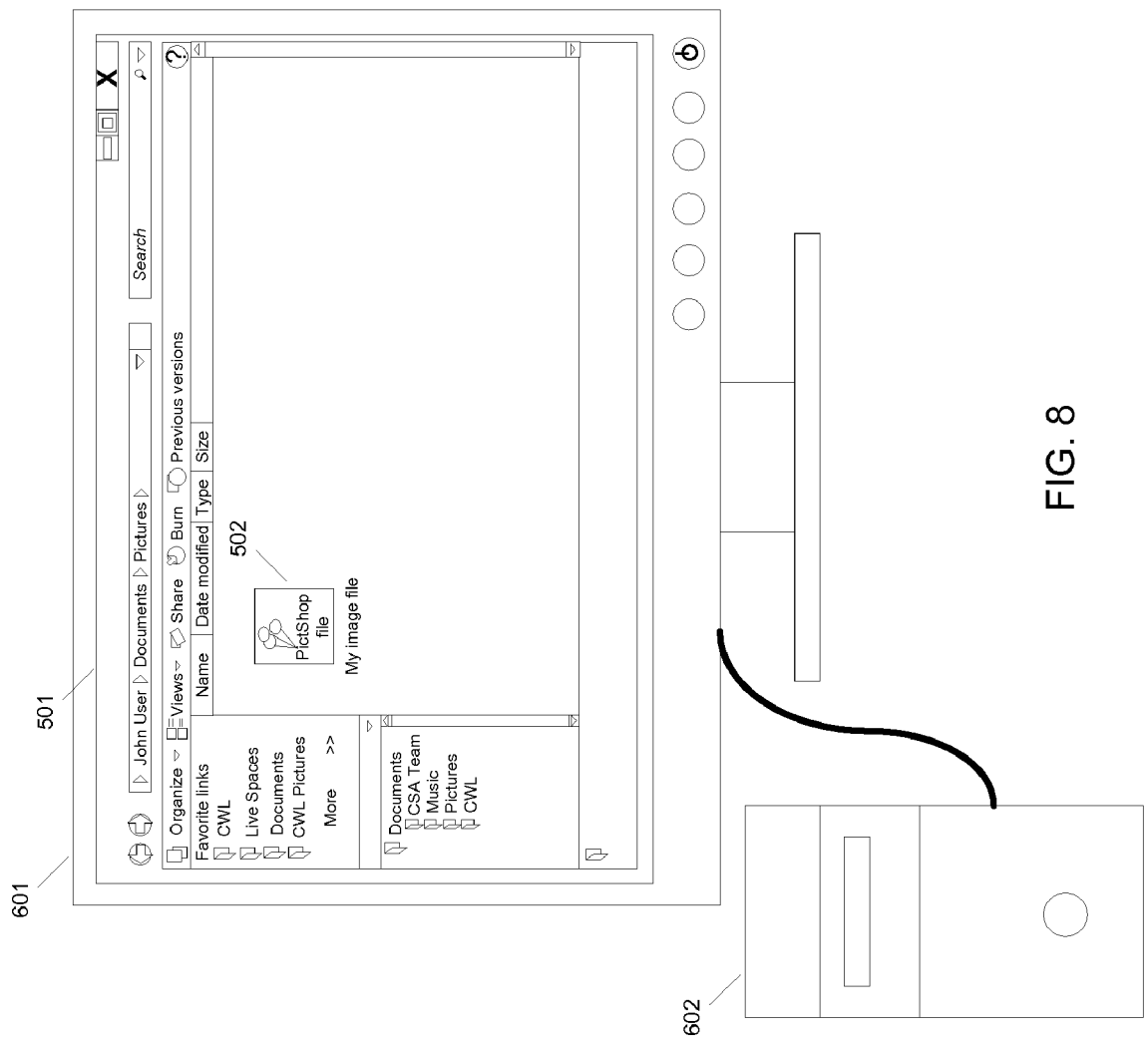
FIG. 8 illustrates an example of accessing a data file on a collaborating device in a mesh.

FIG. 8 illustrates an example of accessing a data file on a collaborating device in a mesh. In this example, a data file and/or an application program corresponding to the data file is not stored locally at the device. As FIG. 8 illustrates, a device may include a computing device 602 which may also include a memory for storing information or data used by the computing device 602. The computing device 602 may also be connected to a display device 601 for displaying information relevant to the user. For example, the display device 601 may display a window or user interface 501 which may further include an icon 502 representing a data file of interest (in this example, the data file of interest includes an image file).

The data file represented by icon 502 and/or the application program that permits launching, accessing, or activating of the data file may not be stored locally in memory of the computing device 602. Thus, the information and data (i.e., data file and/or application program corresponding to the data file) is not associated, owned, or controlled by the computing device 602. Rather, the information and data is associated, owned, or controlled by the user instead of the any device associated with the user.

Figure 9:
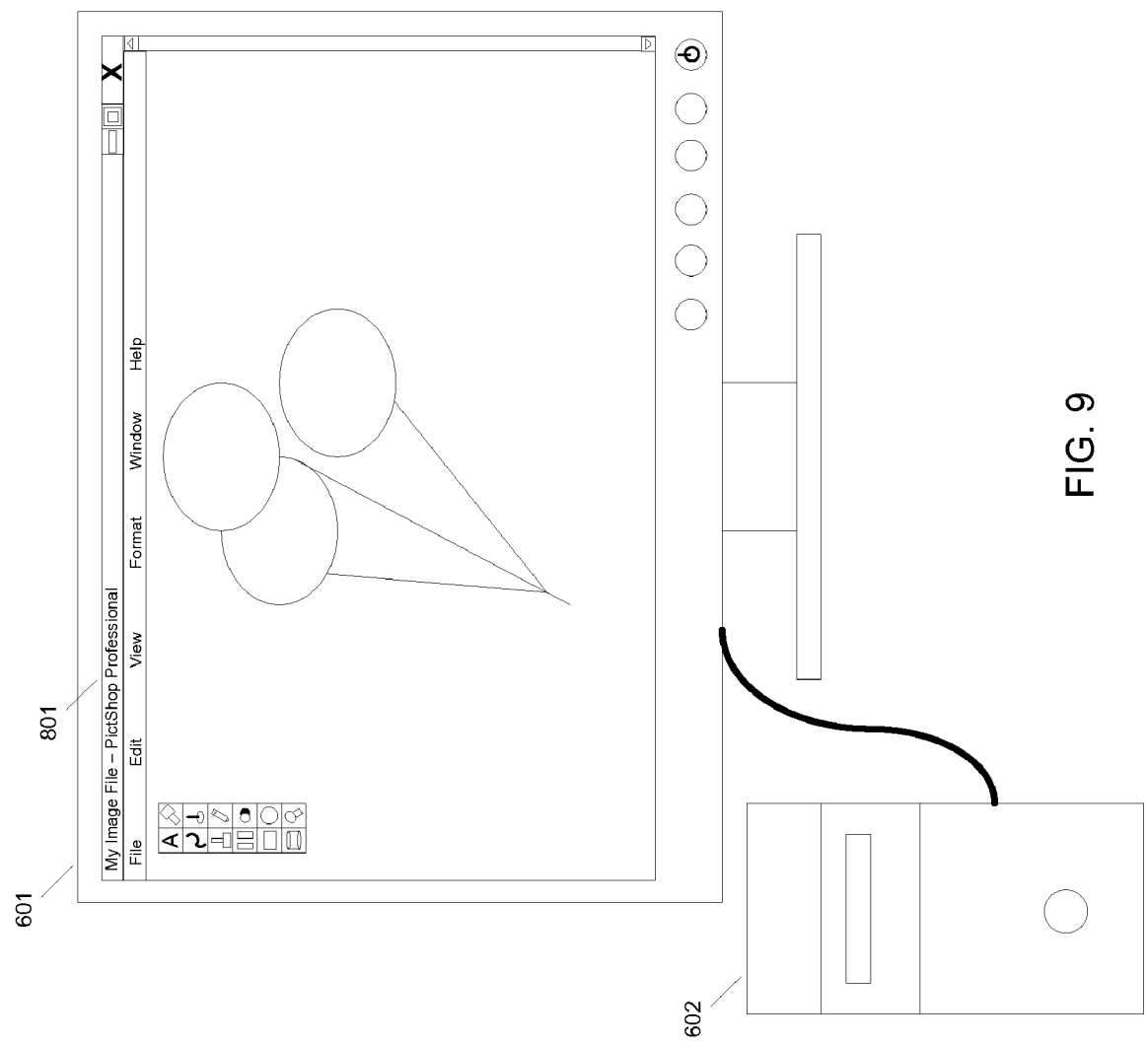
FIG. 9 illustrates an example of activation of a data file via launching of a corresponding application program.

FIG. 9 illustrates an example of activation of a data file via launching of a corresponding application program when the data file and/or corresponding application program is not owned or controlled by the device on which the data file is activated or opened. In this example, a computing device 602 is connected to a display device 601. Activation of an icon (such as icon 502) representing a desired data file may be selected. In this example, the application program corresponding to the data file is not stored at the computing device 602. Rather, the application program may be stored at a remote location but may also be associated with a particular user. The user may thus use the computing device 602 to access the application program (and/or data file corresponding to the application program) while the application program is located remotely from the device itself.

As FIG. 9 illustrates, the "PictShop" image file is launched and activated on the computing device 602 and a corresponding user interface or window 801 is displayed. The user may thus access the data file and the application program launching and may obtain a corresponding user interface for the data file even if any or all of the components are not owned or controlled by the device on which the user is accessing the information.

Figure 10:
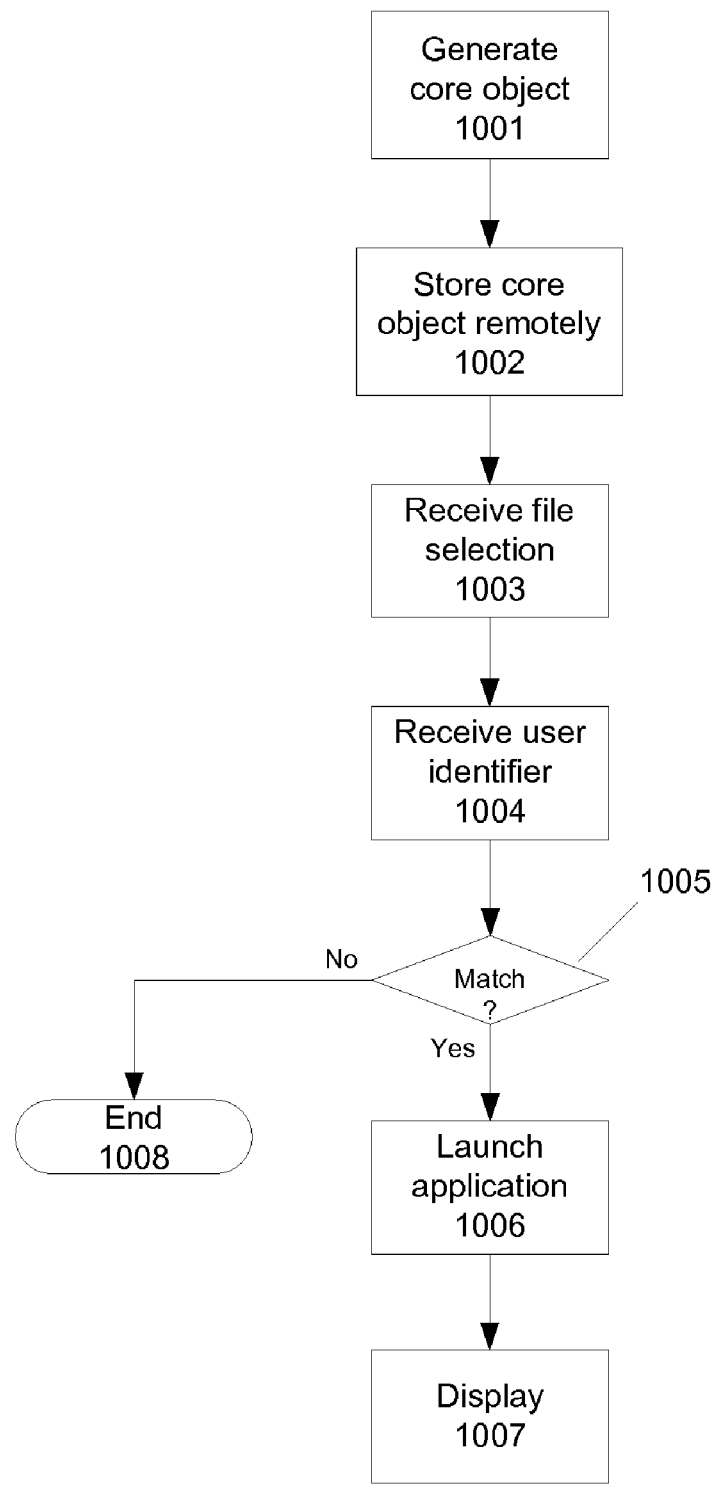
FIG. 10 is a flowchart illustrating an example of a method of accessing desired information.

FIG. 10 is a flowchart illustrating an example of a method of accessing desired information. A core object is generated in STEP 1001. In one example of a core object, the core object contains a data file, an application program corresponding to the data file, and a user interface corresponding to the data file and corresponding application program. The core object is associated with a corresponding user rather than being associated with a particular device. Thus, a user may access the core object independently of the device being used by the user.

In STEP 1002, the core object is stored remotely from a user device. For example, a user may have a home computer. A core object is created containing data files of interest, application programs for the data files and user interfaces (STEP 1001). This core object in this example is not stored on the user's home computer. Rather, the core object may be stored at an alternate location. However, the core object is associated with the user such that the user may still access the core object and the information contained therein from the home computer (or any other device utilized by the user).

In this example, the user is using the home computer and may select a desired data file at the home computer (STEP 1003). In addition, the user may input an identifier that identifies the user (STEP 1004). In another example, the identifier may be associated with the computer or device and may be provided automatically. The home computer may be a collaborating device in a mesh and may include a mesh operating environment (MOE) that may execute to contact a remote source in the mesh. The remote source may compare the user identifier received from the home computer and the requested data file or application to determine a match (STEP 1005). If a match is identified, the requested data file, application, and user interfaces may be provided to the user's home computer. For example, the core object may be provided to the home computer from a storage location within the mesh. The application corresponding to the requested data file may be launched (STEP 1006) to provide the requested data in a corresponding user interface. Hence, the requested data file may be displayed for the user (STEP 1007).

It is understood that aspects of the present description can take many forms and embodiments. The embodiments shown herein are intended to illustrate rather than to limit the description, it being appreciated that variations may be made without departing from the spirit of the scope of the invention. Although illustrative embodiments have been shown and described, a wide range of modification, change and substitution is intended in the foregoing disclosure and in some instances some features may be employed without a corresponding use of the other features. Accordingly, it is appropriate that the appended claims be construed broadly and in a manner consistent with the scope of the invention.

The invention claimed is:

1. A method comprising:
    storing a core object on a storage device, wherein a network includes the storage device and a plurality of computing devices, and wherein the core object comprises a data file and an application corresponding to the data file and a user interface associated with the application and the data file, and wherein the core object is owned by a user and is not owned by any of the plurality of computing devices;
    receiving, at a first computing device of the plurality of computing devices, an identifier that identifies the user;
    determining a match between the core object and the identifier that identifies the user wherein the match indicates that the user owns the core object; and
    projecting, in response to determining the match, the core object to the first computing device.

2. The method of claim 1 further comprising displaying, by the first computing device, an icon that represents the data file of the core object wherein the icon includes an indication that the data file is not stored locally on the first computing device.

3. The method of claim 2 wherein the projecting includes:
    launching the application; and
    displaying, by the first computing device, the user interface.

4. The method of claim 1 wherein the storage device is one of the plurality of computing devices other than the first computing device.

5. The method of claim 1 wherein the storage device is the first computing device.

6. The method of claim 2 further comprising:
    receiving, at the first computing device, a selection of the icon; and
    launching the application.

7. At least one computer-readable device comprising computer-executable instructions that, when executed by a processor of a first computing device of the plurality of computing devices, cause the first device to perform a method comprising:
    storing a core object on a storage device, wherein a network includes the storage device and the plurality of computing devices, and wherein the core object comprises a data file and an application corresponding to the data file and a user interface associated with the application and the data file, and wherein the core object is owned by a user and is not owned by any of the plurality of computing devices;
    receiving, at the first computing device, an identifier that identifies the user;
    determining a match between the core object and the identifier that identifies the user wherein the match indicates that the user owns the core object; and
    projecting, in response to determining the match, the core object to the first computing device.

8. The at least one computer-readable device of claim 7 further comprising displaying, by the first computing device, an icon that represents the data file of the core object wherein the icon includes an indication that the data file is not stored locally on the first computing device.

9. The at least one computer-readable device of claim 7 wherein the projecting includes:
    launching the application; and
    displaying, by the first computing device, the user interface.

10. The at least one computer-readable device of claim 7 wherein the storage device is one of the plurality of computing devices other than the first computing device.

11. The at least one computer-readable device of claim 7 wherein the storage device is the first computing device.

12. The at least one computer-readable device of claim 8 further comprising:
    receiving, at the first computing device, a selection of the icon; and
    launching the application.

13. A system comprising:
    a first computing device configured to be part of a network that includes a plurality of computing devices and a storage device that is configured to store a core object, wherein the core object comprises a data file and an application corresponding to the data file and a user interface associated with the application and the data file, and wherein the core object is owned by a user and is not owned by any of the plurality of computing devices or the first computing device;

the first computing device further configured to receive an identifier that identifies the user;

the first computing device further configured to determine a match between the core object and the identifier that identifies the user wherein the match indicates that the user owns the core object; and the first computing device further configured to, in response to determining the match, receive a projection of the core object.

14. The system of claim 13 further comprising the first computing device further configured to display an icon that represents the data file of the core object wherein the icon includes an indication that the data file is not stored locally on the first computing device.

15. The system of claim 13 further comprising the first computing device further configured to launch the application and to display the user interface.

16. The system of claim 13 wherein the storage device is one of the plurality of computing devices.

17. The system of claim 13 wherein the storage device is the first computing device.

18. The system of claim 13 further comprising the first computing device further configured to receive a selection of the icon and to launch the application.

* * * * *